(12) United States Patent
Chisholm et al.

(10) Patent No.: US 7,922,961 B2
(45) Date of Patent: Apr. 12, 2011

(54) MOLDED PLASTIC CONTAINER HAVING INSERT-MOLDED INSERT AND METHOD OF MANUFACTURE

(75) Inventors: Brian J. Chisholm, Sylvania, OH (US);
Louis Osika, Orland Park, IL (US);
Kirk W. Rudolph, Perrysburg, OH (US)

(73) Assignee: Rexam Healthcare Packaging Inc., Perrysburg, OH (US)

( * ) Notice: Subject to any disclaimer, the term of this patent is extended or adjusted under 35 U.S.C. 154(b) by 1188 days.

(21) Appl. No.: 11/595,059

(22) Filed: Nov. 10, 2006

(65) Prior Publication Data

US 2008/0110774 A1    May 15, 2008

(51) Int. Cl.
*B29C 45/14* (2006.01)
(52) U.S. Cl. ....................................................... 264/516
(58) Field of Classification Search ............... 264/516, 264/274
See application file for complete search history.

(56) References Cited

U.S. PATENT DOCUMENTS

| | | | |
|---|---|---|---|
| 2,788,048 A | 4/1957 | Kimes | |
| 4,218,204 A | * 8/1980 | Edwards | .................... 425/129.1 |
| 4,323,411 A | 4/1982 | Uhlig | |
| 4,572,856 A | 2/1986 | Gembinski | |
| 4,605,462 A | 8/1986 | Lehner | |
| 4,708,630 A | 11/1987 | Hammond | |
| 4,813,564 A | 3/1989 | Cooper et al. | |
| 4,988,472 A | 1/1991 | Orimoto et al. | |
| 6,251,323 B1 | 6/2001 | Hoedl et al. | |
| 6,259,369 B1 | 7/2001 | Monico | |
| 6,268,037 B1 | 7/2001 | Butler et al. | |
| 6,646,554 B1 | 11/2003 | Goff et al. | |
| 6,724,308 B2 | 4/2004 | Nicholson | |
| 7,070,053 B1 | 7/2006 | Abrams et al. | |
| 7,176,796 B2 | 2/2007 | Chen et al. | |
| 7,342,501 B2 | 3/2008 | Abbott | |
| 7,388,506 B2 | 6/2008 | Abbott | |
| 7,439,933 B2 | 10/2008 | Uesaka | |
| 2003/0095253 A1 | 5/2003 | Chow | |
| 2003/0148050 A1 | 8/2003 | Taniguchi | |
| 2003/0235027 A1 | 12/2003 | Smeyak et al. | |
| 2004/0008123 A1 | 1/2004 | Carrender et al. | |

(Continued)

FOREIGN PATENT DOCUMENTS

DE    10155786    5/2002

(Continued)

OTHER PUBLICATIONS

Collins, Jonathan, "Rafsec Debuts Packaging RFID Tag" Article, Sep. 18, 2003, RFID Journal, webpage, www.rfidjournal.com/article, 2 pages.

(Continued)

*Primary Examiner* — Christina Johnson
*Assistant Examiner* — Galen Hauth
(74) *Attorney, Agent, or Firm* — Reising Ethington PC

(57) ABSTRACT

A plastic container has an open end and an imperforate container wall with a base, an outwardly open pocket in the container wall, and an insert disposed in the pocket. The insert preferably is captured in the pocket by blow molding the container wall around the insert. The pocket and insert preferably are disposed in the base of the container opposite the open end of the container, most preferably centrally of the base, and the insert preferably is visible in the container base through an external opening into the pocket.

10 Claims, 12 Drawing Sheets

U.S. PATENT DOCUMENTS

| | | |
|---|---|---|
| 2004/0238623 A1 | 12/2004 | Asp |
| 2005/0068182 A1 | 3/2005 | Dunlap et al. |
| 2005/0287241 A1 | 12/2005 | Rudolph |
| 2007/0051691 A1 | 3/2007 | Hidding |
| 2007/0182562 A1 | 8/2007 | Abbott et al. |
| 2008/0068178 A1 | 3/2008 | Meyer |
| 2008/0129514 A1 | 6/2008 | Chisholm |
| 2008/0131629 A1 | 6/2008 | Chisholm et al. |
| 2008/0309495 A1 | 12/2008 | Chisholm |

FOREIGN PATENT DOCUMENTS

| | | |
|---|---|---|
| DE | 10237187.3 | 7/2003 |
| JP | 03295629 | 12/1991 |
| JP | 04-174668 | 6/1992 |
| JP | 07-088152 | 4/1995 |
| JP | 2000334810 | 12/2000 |
| WO | WO 93/24381 | 12/1993 |

OTHER PUBLICATIONS

Drobny, Jiri George Handbook of Thermoplastic Elastomers. William Andrew Publishing/Plastics Design Library. p. 102-103 Online version available at: http://knovel.com/web/portal/browse/display?_ECT_KNOVEL_DISPLAY_bookid=2043&VerticalID=0.

International Search Report, Written Opinion, Preliminary Report, International Application No. PCT/US2008/066428, mailing date Aug. 26, 2008, 21 pages.

International Search Report, Written Opinion, Preliminary Report, International Application No. PCT/US2007/016393, mailing date Feb. 20, 2009, 30 pages.

International Search Report, Written Opinion, Preliminary Report, international Application No. PCT/US2007/016116, mailing date May 2, 2008, 21 pages.

International Search Report, Written Opinion, Preliminary Report, International Application No. PCT/US2007/016285, mailing date Feb. 19, 2009, 35 pages.

International Search Report, Written Opinion, Preliminary Report, International Application No. PCT/US2007/000817, filing date Nov. 1, 2007, 23 pages.

International Search Report, Written Opinion, Preliminary Report, International Application No. PCT/US2007/000868, mailing date May 6, 2007, 30 pages.

International Search Report, Written Opinion, Preliminary Report, International Application No. PCT/US2007/000967, mailing date Jun. 18, 2007, 24 pages.

* cited by examiner

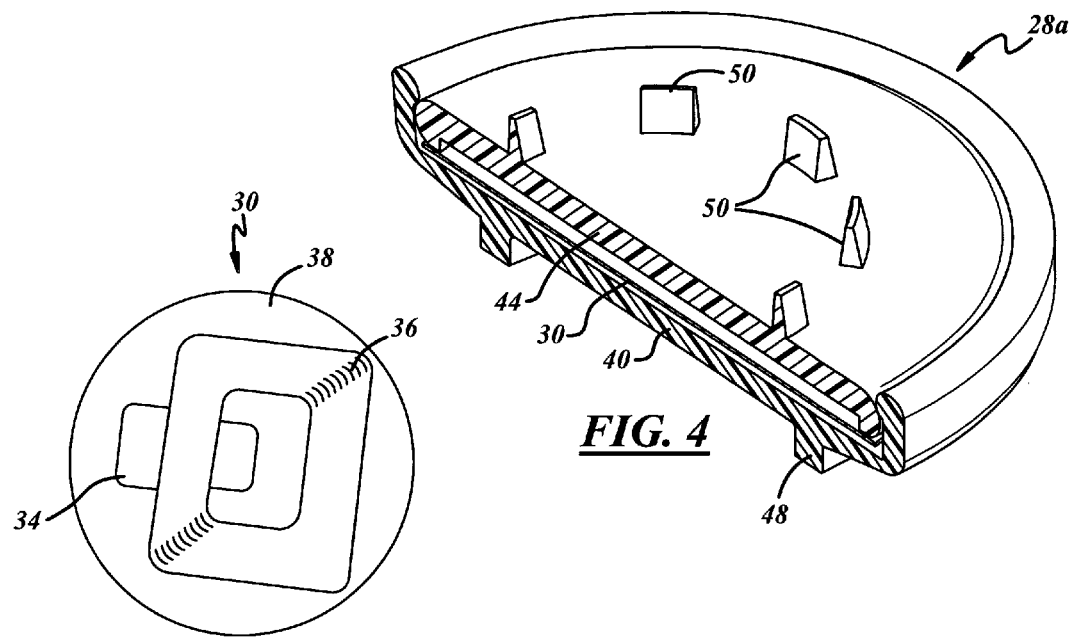
*FIG. 3*
*FIG. 4*
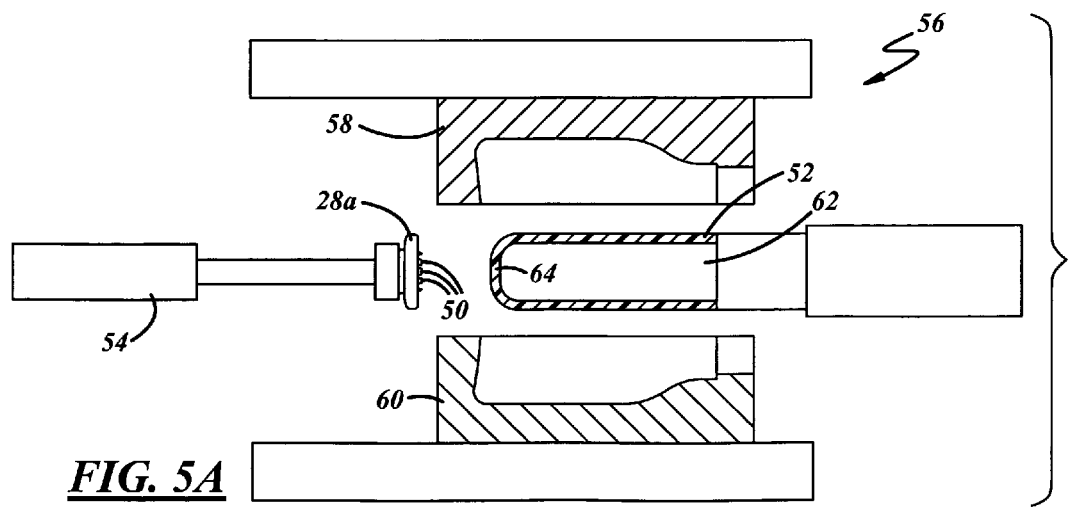
*FIG. 5A*

MOLDED PLASTIC CONTAINER HAVING INSERT-MOLDED INSERT AND METHOD OF MANUFACTURE

The present disclosure relates to manufacture of a molded plastic container having a radio frequency identification (RFID) tag molded into a wall of the container, and/or to manufacture of a preform for blow molding into a plastic container having an RFID tag on a wall of the preform, and/or to an RFID insert for molding into a wall of a container and/or disposition on a wall of a container preform.

BACKGROUND AND SUMMARY OF THE DISCLOSURE

It has been proposed to place an RFID tag on or in a wall of a container to confirm the genuineness of the package that includes the container and/or to provide other information concerning the package or a product within the package. Such RFID tag can be secured to a wall of the container after fabrication of the container, embedded in a wall of the container during blow molding of the container, or assembled to a container preform in such a way that the tag will be embedded in a wall of the container following blow molding of the preform.

U.S. application Ser. No. 11/348,662 filed Feb. 7, 2006 discloses a method of making a plastic container having an RFID tag in a wall of the container by providing a mold that includes a mold core and mounting on the mold core an insert that includes an RFID tag. A plastic preform is formed in the mold around the mold core and the insert such that the insert is embedded in a wall of the preform. The preform can be blow molded into a plastic container having the insert embedded in a wall of the container.

The present disclosure embodies a number of aspects that can be implemented separately from or in combination with each other.

A plastic container, in accordance with one aspect of the present disclosure, has an open end and an imperforate container wall with a base, an outwardly open pocket in the container wall, and an RFID tag in a plastic housing disposed in the pocket. The housing containing the RFID tag preferably is captured in the pocket by blow molding the container wall around the housing. The pocket and housing preferably are disposed in the base of the container opposite the open end of the container, most preferably centrally of the base, and the housing preferably is visible in the container base through an external opening into the pocket.

A method of making a plastic container, in accordance with another aspect of the present disclosure, includes providing a plastic container preform, placing the container preform in a blow mold and blowing the plastic preform within the blow mold to form a hollow plastic container. An RFID tag is placed on an actuator external to the blow mold and, prior to blowing the preform, the actuator is actuated and the RFID tag is placed within the blow mold so that the tag is molded into an external surface of the container during blow molding of the preform. The RFID tag preferably is molded into a pocket on the base of the container by molding the container base around the RFID tag such that the tag is visible through an opening into the pocket. The RFID tag preferably is disposed in a plastic housing having a wall, and the container is blown such that the container base material abuts the housing wall to form the opening through which the RFID tag housing is visible. In various exemplary embodiments of the disclosure, the RFID tag is placed within the blow mold by mounting the tag on an external surface of the container preform, preferably at the closed end of the container preform, by extending the actuator into the blow mold such that the end of the actuator forms part of the blow mold and the RFID tag is positioned adjacent to an inside surface of the blow mold, or by mounting the RFID tag on a movable segment of the blow mold and then moving the segment so that the tag is positioned within the blow mold.

A plastic container that includes an open end and an imperforate container base, an outwardly open pocket in the container base, and an insert disposed within the pocket.

A method of making a plastic container, which includes the steps of:

(a) providing a plastic container preform,
(b) placing the plastic container preform in a blow mold,
(c) blowing the plastic container preform within the blow mold to form a hollow plastic container,
(d) placing an insert having a wall on an actuator external to the blow mold, and
(e) prior to the step (c) actuating the actuator and placing the insert within the blow mold so that the insert is molded into an outwardly open pocket of the container during the step (c) when container material is blown against the insert wall which forms a dam against flow of container material around the insert and forms an opening into the pocket through which the insert is visible.

BRIEF DESCRIPTION OF THE DRAWINGS

The disclosure, together with additional objects, features, advantages and aspects thereof, will best be understood from the following description, the appended claims and the accompanying drawings, in which:

FIG. 3 is a plan view of the RFID inlay in the insert of FIGS. 1 and 2;

FIG. 4 is a sectioned perspective view of an RFID insert in accordance with one exemplary embodiment of the present disclosure;

FIGS. 5A-5E are schematic diagrams that illustrate one exemplary method of making the container of FIGS. 1 and 2 employing the insert of FIG. 4;

DETAILED DESCRIPTION OF PREFERRED EMBODIMENTS

Figure 1:
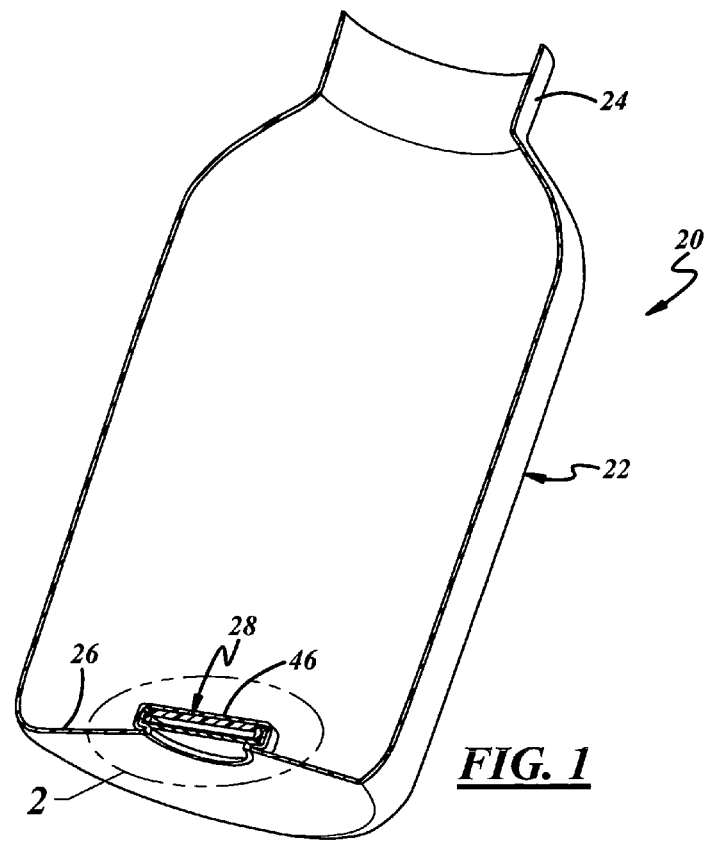
FIG. 1 is a sectioned perspective view of a blow molded plastic container in accordance with an exemplary embodiment of the present disclosure.
Figure 2:
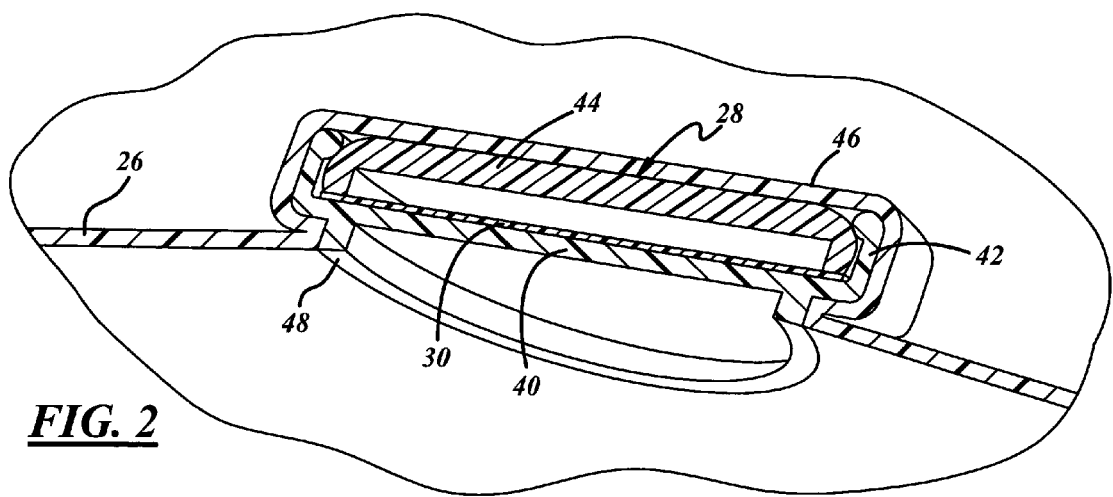
FIG. 2 is a fragmentary sectional view on an enlarged scale of the portion of FIG. 1 within the area 2.

FIGS. 1 and 2 illustrate a blow molded plastic container 20 in accordance with an exemplary embodiment of the present disclosure. Container 20 includes a container body 22 having an open end 24 and a container base 26. Container body 22 and open end 24 can be of any suitable geometry, and may have any suitable structure for securing a closure to the open end of the container. Container base 26 can be of any suitable geometry. The term "container base" typically, although not necessarily, refers to the wall portion of the container opposite open end 24 and/or on which the container normally is stood.

An RFID insert 28 is mounted on, preferably embedded in, an outer surface of container body 22, preferably container base 26. The exemplary RFID insert 28 includes an RFID inlay 30 disposed within a plastic housing. Inlay 30 includes an RFID microcircuit or tag 34 (FIG. 3) coupled to an rf antenna 36 and disposed on a substrate 38. It also is envisioned that the inlay could be comprised only of circuit or tag 34 with a built-in antenna and without a substrate. The plastic housing illustrated in FIG. 2 (and FIG. 4) is a multipiece housing having a base 40 with a peripheral wall 42, and a disk 44 mounted within peripheral 42 to capture inlay 30 between disk 44 and base 40. As an alternative to the multipiece housing, the housing can be of one-piece integral plastic construction molded around tag 34. The housing preferably is of circular peripheral geometry, and the top and bottom surfaces can be substantially flat, convex or concave.

Container body 22, preferably container base 26, is blow molded around insert 28 in such a way that insert 28 is disposed in a pocket 46 following blow molding. Insert 28 preferably has a wall 48, most preferably an annular wall, that abuts the opposing surface of the blow mold and effectively forms a dam against flow of plastic material around insert 28 during the blowing operation. Thus, as best seen in FIG. 2, wall 48 effectively forms an opening into pocket 46 through which insert 28 can be viewed from outside of the container. The plastic housing of insert 28 can be of any suitable plastic material, and can be colored differently from the coloring of container body 22 so that presence of the insert in the container can readily be verified by either automated or manual visual inspection.

Figure 5B:
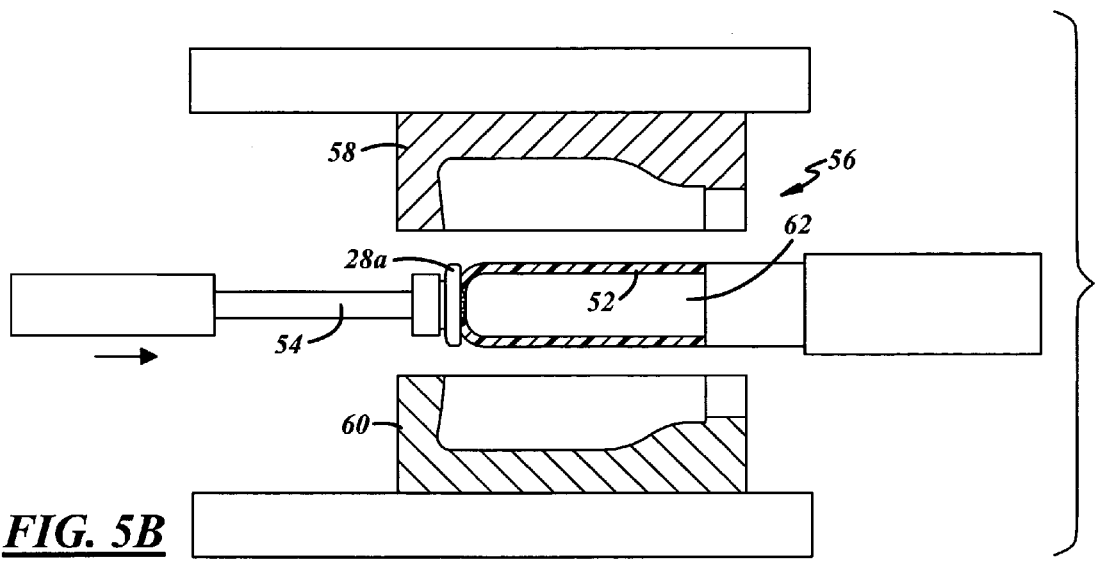
Figure 5C:
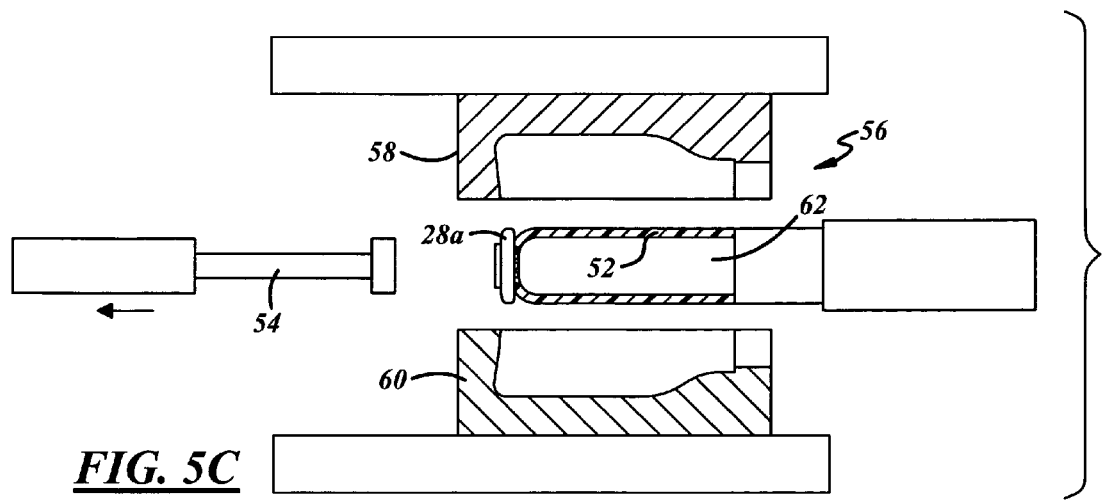
Figure 5D:
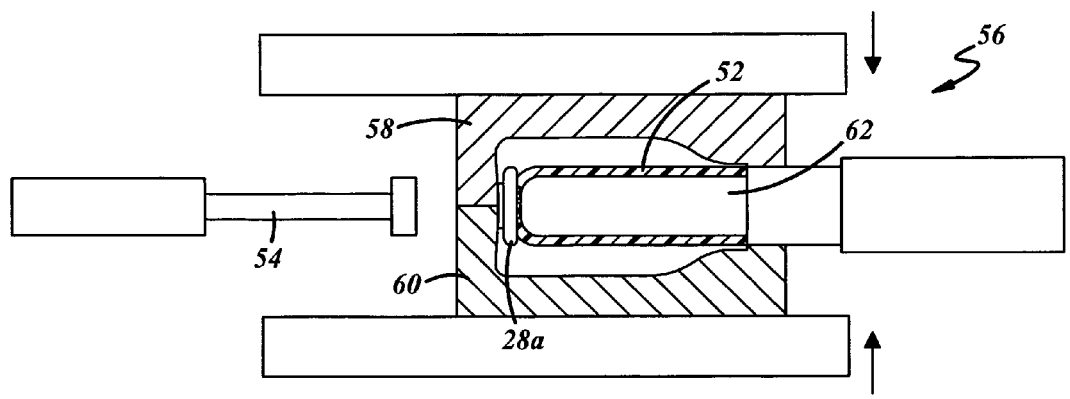
Figure 5E:
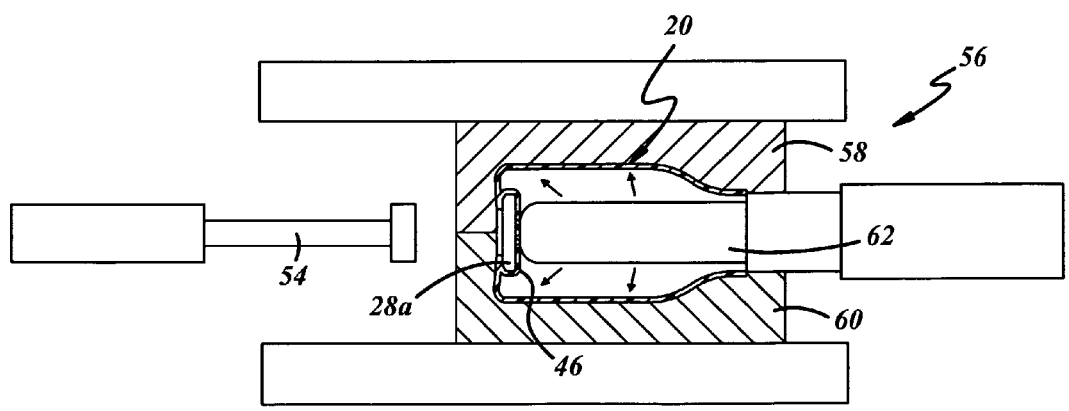

FIGS. 4 and 5A-5E illustrate an insert 28a and a method of making container 20 employing such insert. The plastic housing of insert 28a, whether of one-piece or multipiece construction, has at least one external finger, prong, lug or other suitable feature 50 that extends from the housing. Feature 50 can be of any suitable geometry for holding insert 28a in place on a plastic preform 52 (FIGS. 5A-5D) until the blow molding step (FIG. 5E), after which insert 28 will be captured within pocket 46 of the container wall. Wedge-shaped lugs or features 50 are disposed in a circular array in the exemplary embodiment of FIG. 4. Insert 28a is mounted on the end of an actuator 54. Actuator 54 is disposed outside of the blow mold 56 formed by mold sections 58,60. Plastic container preform 52 may be formed on a mold core rod 62, such as by injection or compression molding around mold core rod 62. Preform 52 can be of any suitable geometry, and preferably has a closed end 64 that ultimately forms container base 26 (FIGS. 1 and 2). In one exemplary implementation of the present disclosure, preform 52 is formed on core rod 62 at the injection stage of a rotary turret-type injection blow molding machine and then transported to the blow mold stage illustrated in FIGS. 5A-5E. Before mold sections 58,60 are closed around preform 52, and while the preform is still at elevated temperature from the injection stage, RFID insert 28a is externally mounted to preform closed end 64 by means of actuator 54. With RFID insert 28a mounted on actuator 54 (FIG. 5A), actuator 54 is extended between blow mold sections 58,60 (FIG. 5B) to embed features 50 (FIG. 4) of insert 28a into closed end 64 of preform 52. Features 50 are embedded in the closed end of the preform, but preferably do not extend to core rod 62 or into the interior of the preform. Actuator 54 then is retracted (FIG. 5C), mold sections 58,60 are closed (FIG. 5D), and preform 52 is blown to form container 20 (FIG. 5E). In the container as blow molded, RFID insert 28a is captured within pocket 46 in base 26 of the container as illustrated in FIGS. 1-2 and 5E. The blow mold sections 58, 60 then are opened and container 12 is transported to an ejection station.

Figure 6A:
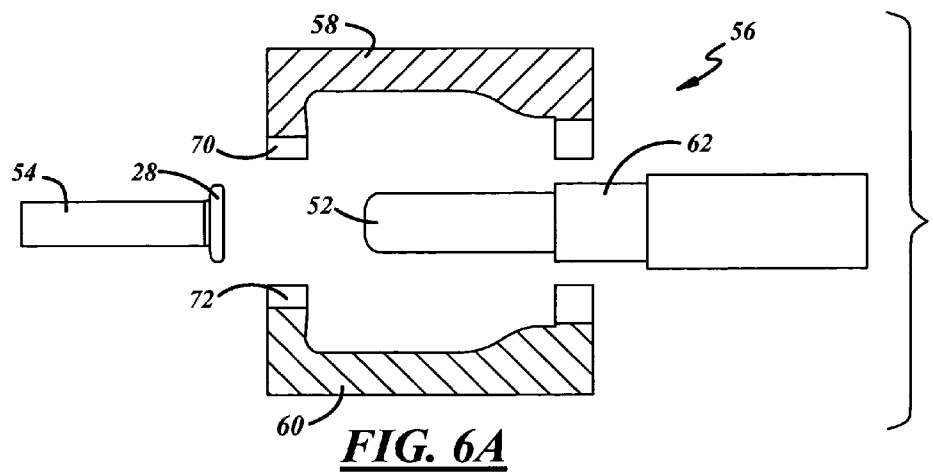
FIGS. 6A-6D are schematic diagrams that illustrate another exemplary method of making the container of FIGS. 1 and 2.
Figure 6B:
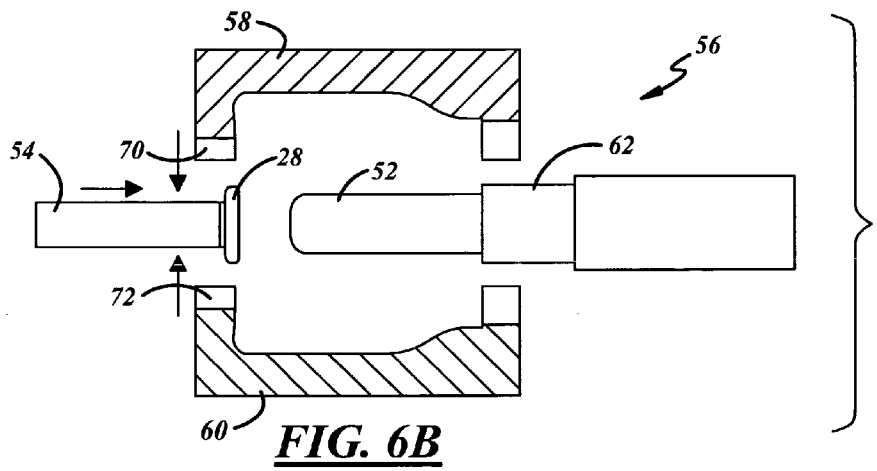
Figure 6C:
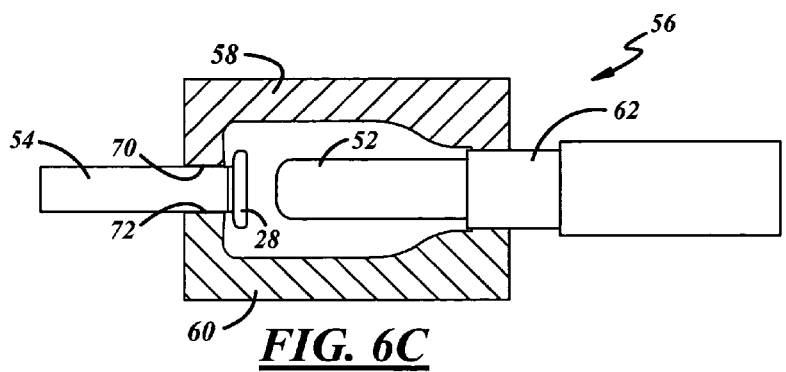
Figure 6D:
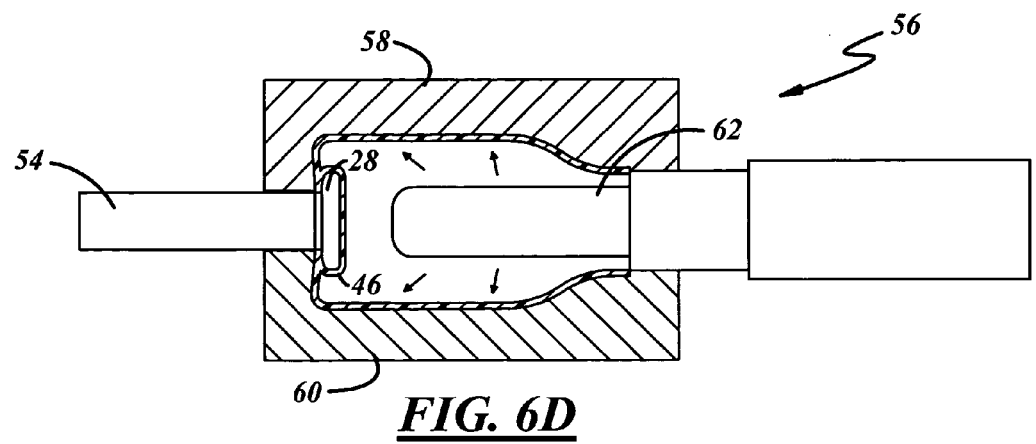

FIGS. 6A-6D illustrate a second exemplary method of making container 20 (FIGS. 1-2) in accordance with the present disclosure. With mold sections 58,60 open, actuator 54 is extended (FIG. 6A to 6B) to position insert 28 within the blow mold cavity, and mold segments 58,60 are then closed around actuator 54 (FIG. 6C). Blow mold sections 58,60 have respective cut-outs 70,72 to embrace actuator 54 so that insert 28 is disposed adjacent to the inside surfaces of blow mold sections 58,60 and the end of actuator 54 effectively forms a portion of the blow mold surface. With mold sections 58,60 closed (FIG. 6C) preform 52 is blow molded to the confines of the mold sections (FIG. 6D) to form container 20 including pocket 46 that surrounds and captures insert 28. Blow mold sections 58,60 are then opened, actuator 54 is retracted and container 20 is moved to an ejection station.

Figure 7A:
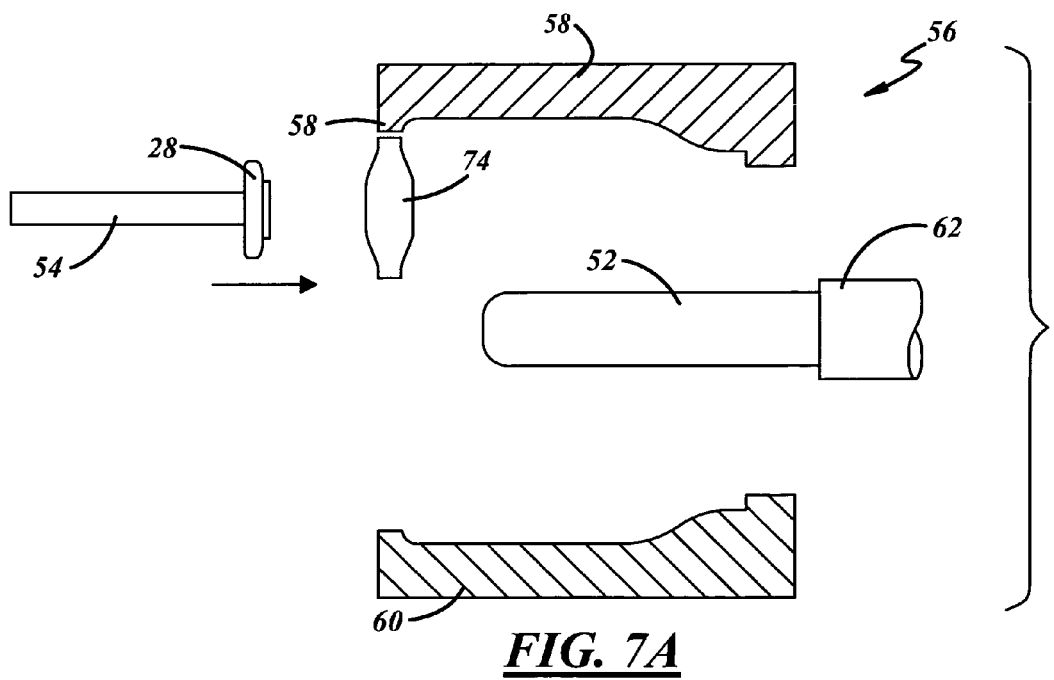
FIGS. 7A-7G are schematic diagrams that illustrate yet another exemplary method of making the container of FIGS. 1 and 2.
Figure 7B:
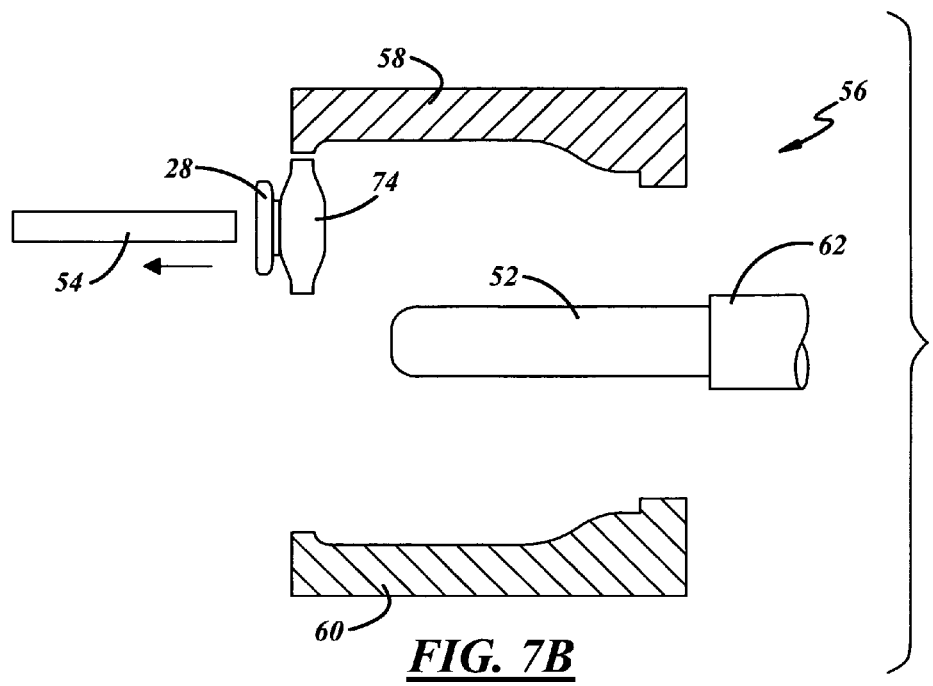
Figure 7C:
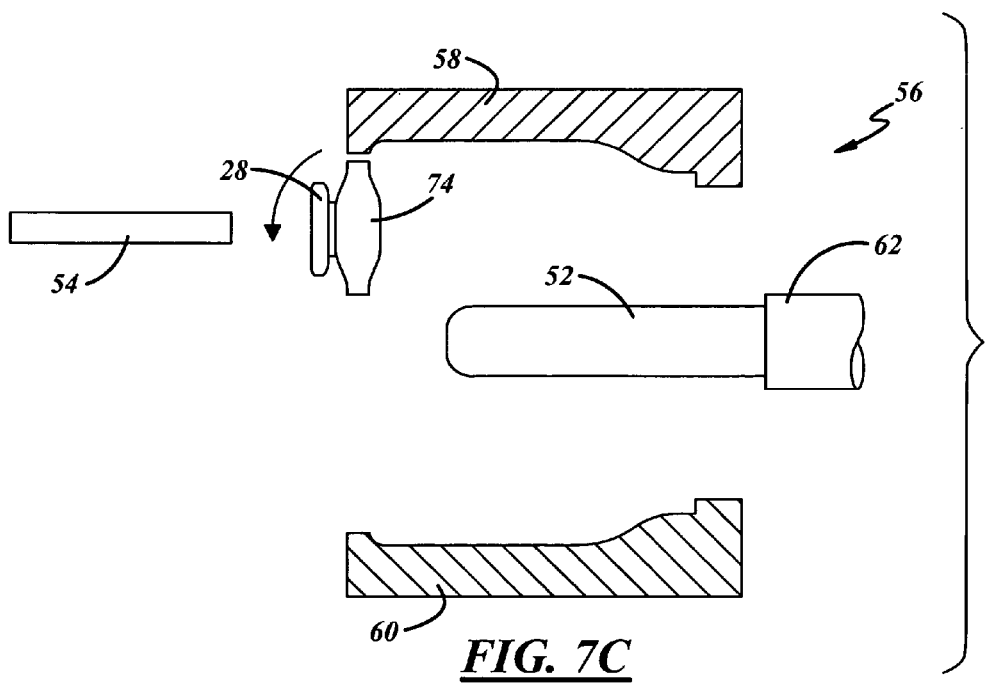
Figures 7D, 7E:
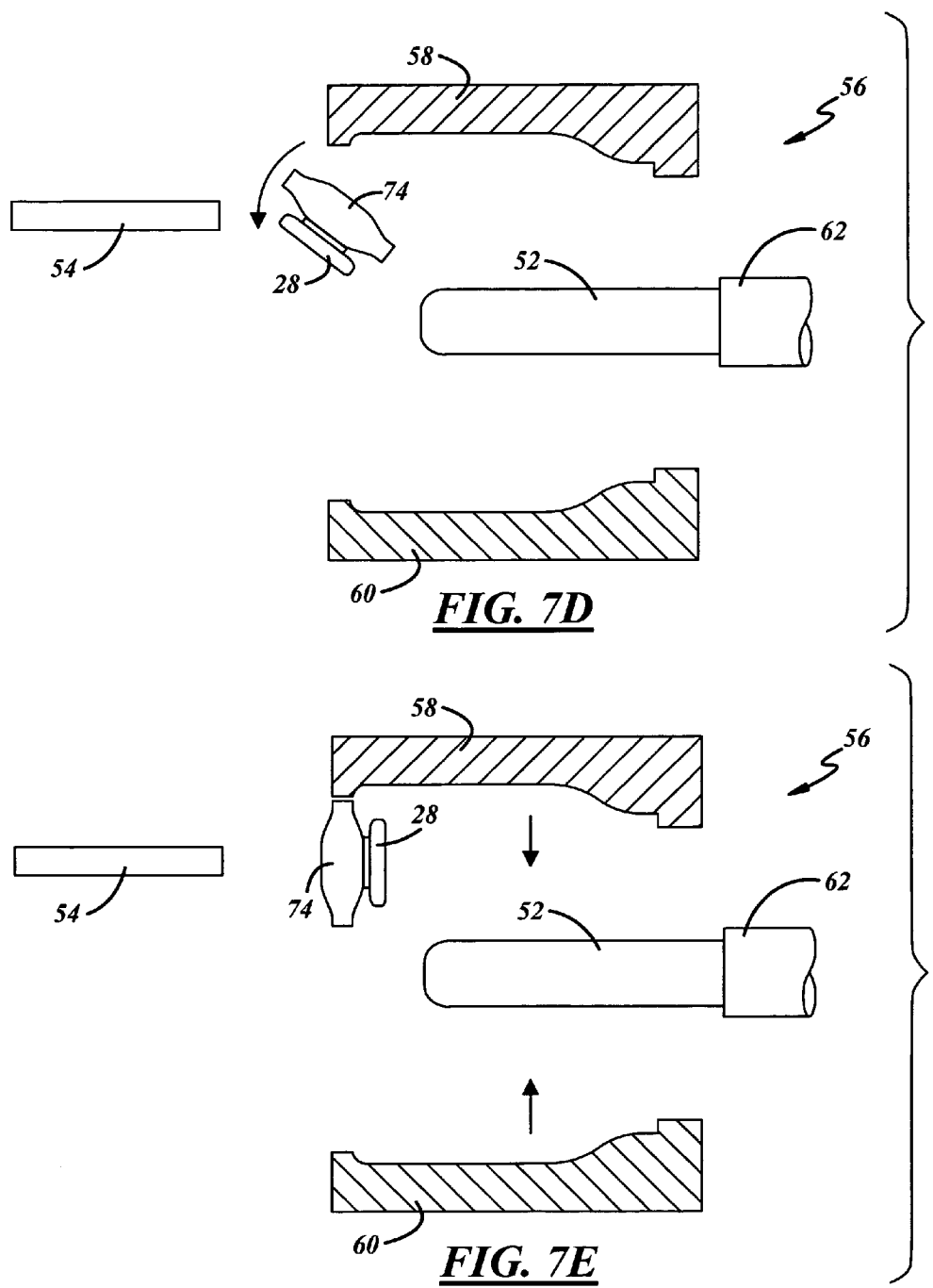
Figure 7F:
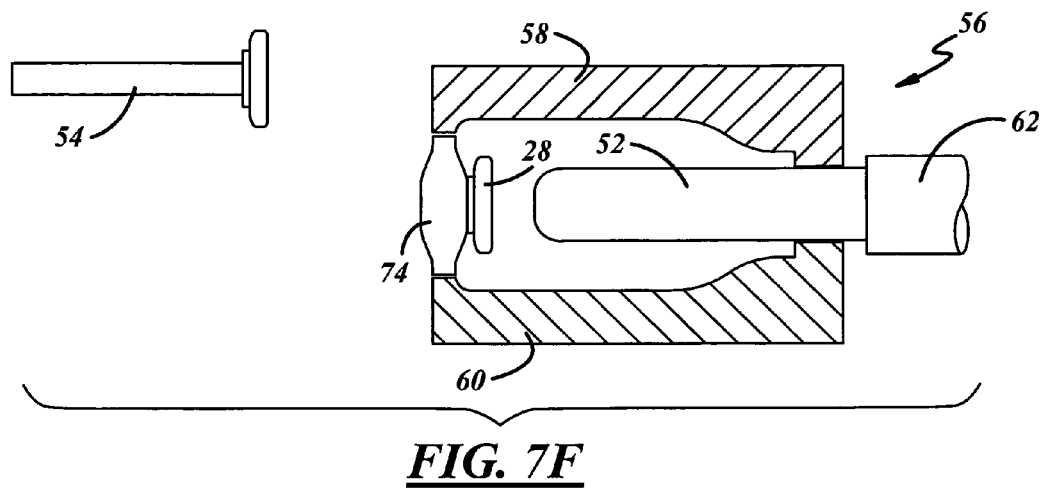
Figure 7G:
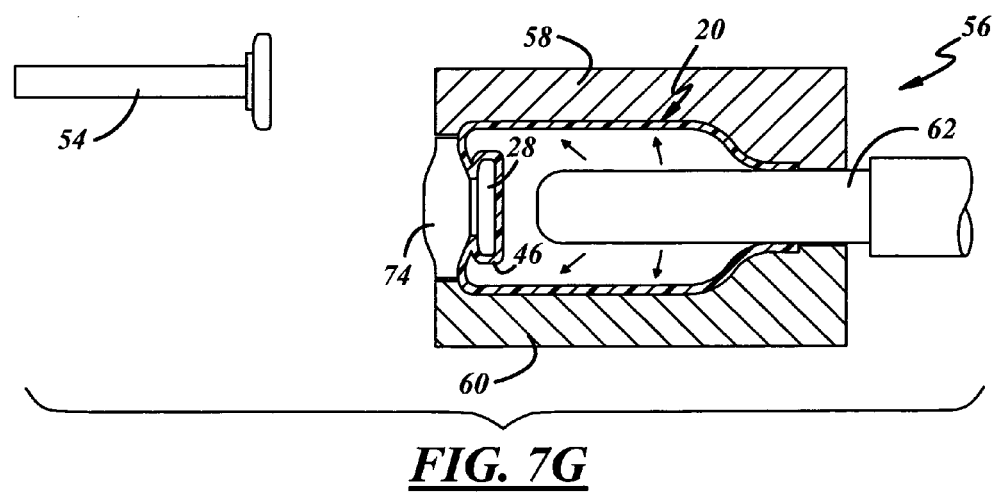
Figure 8A:
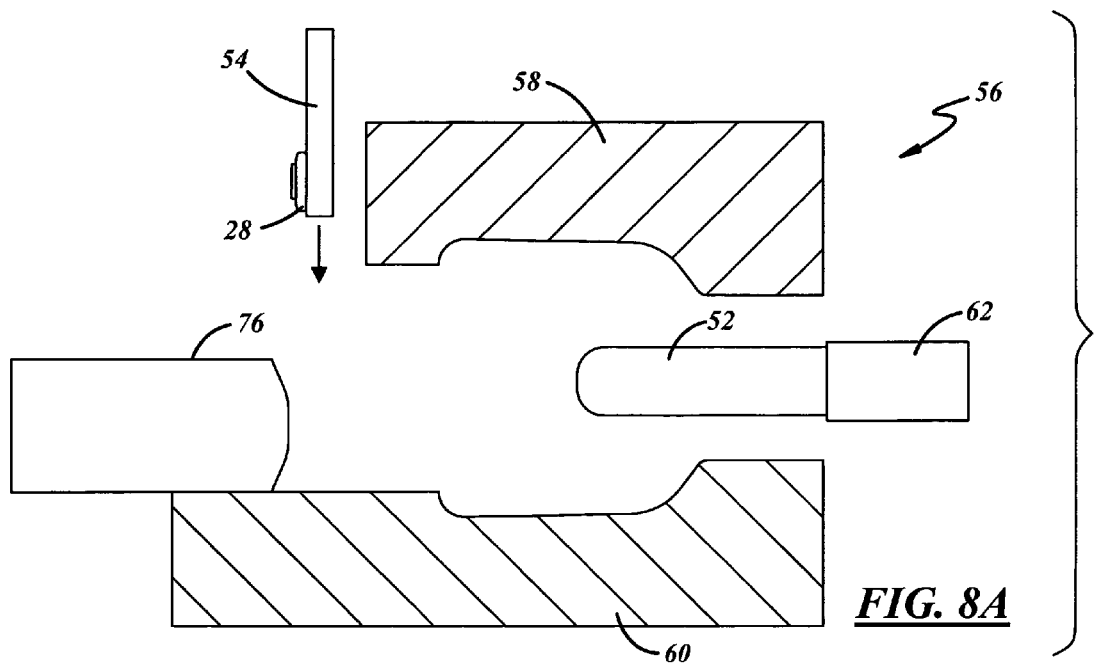
FIGS. 8A-8F are schematic diagrams that illustrate a further exemplary method of making the container of FIGS. 1 and 2.
Figure 8B:
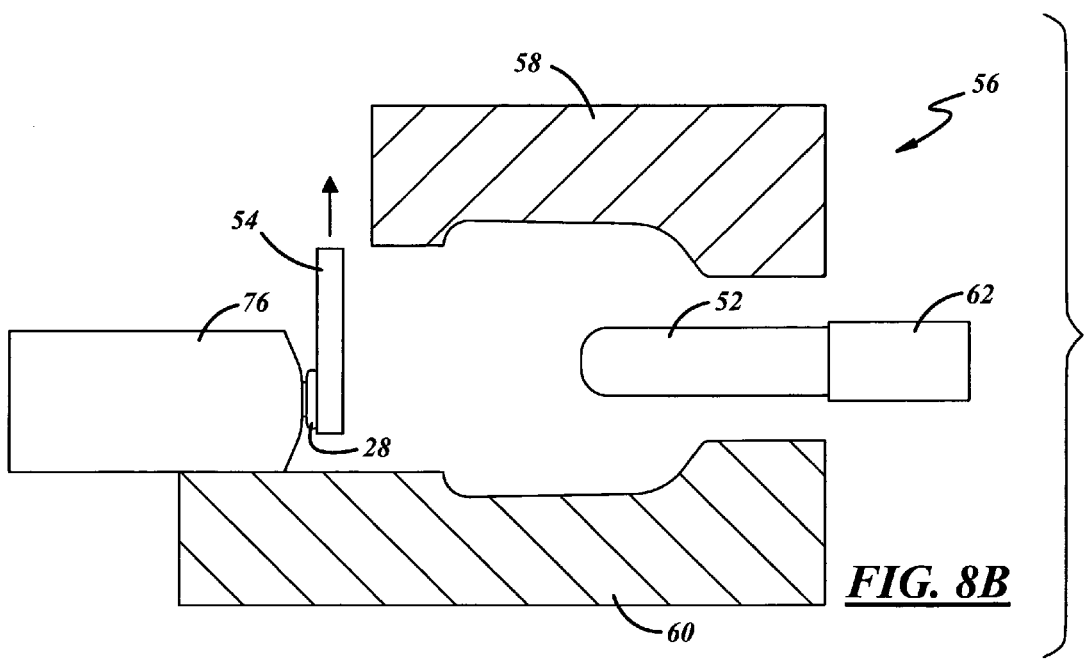
Figure 8C:
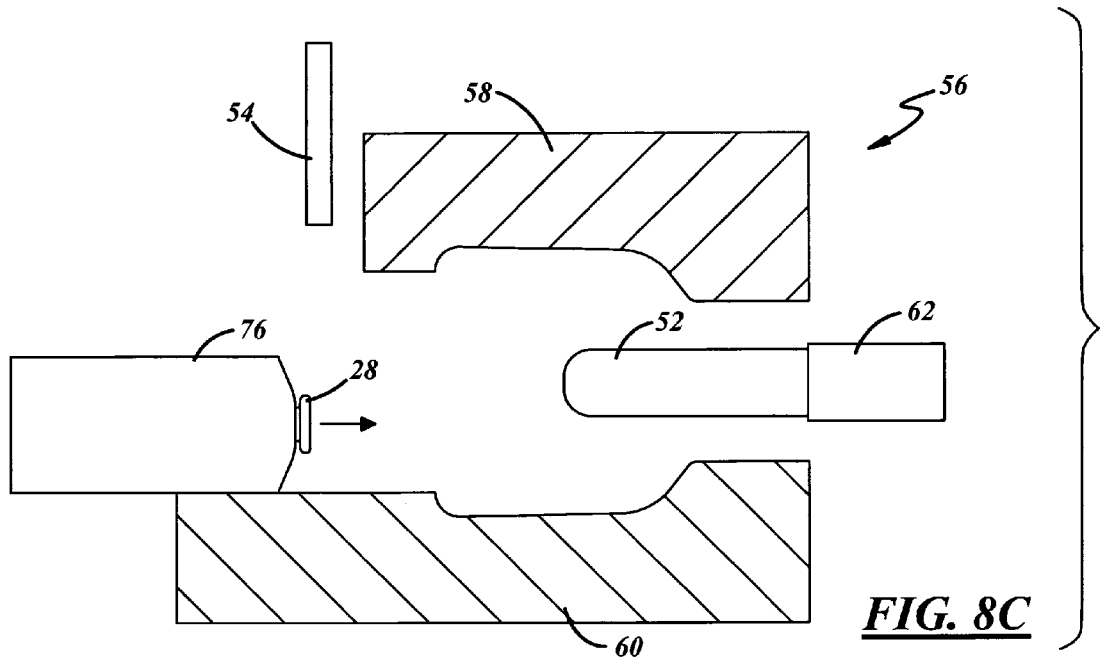
Figure 8D:
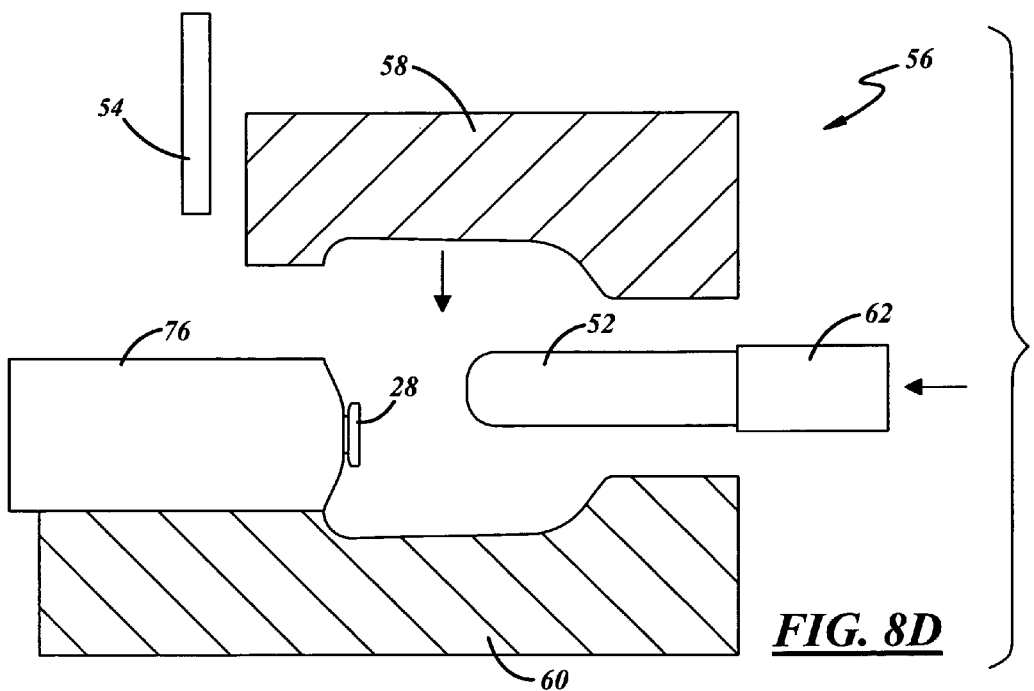
Figure 8E:
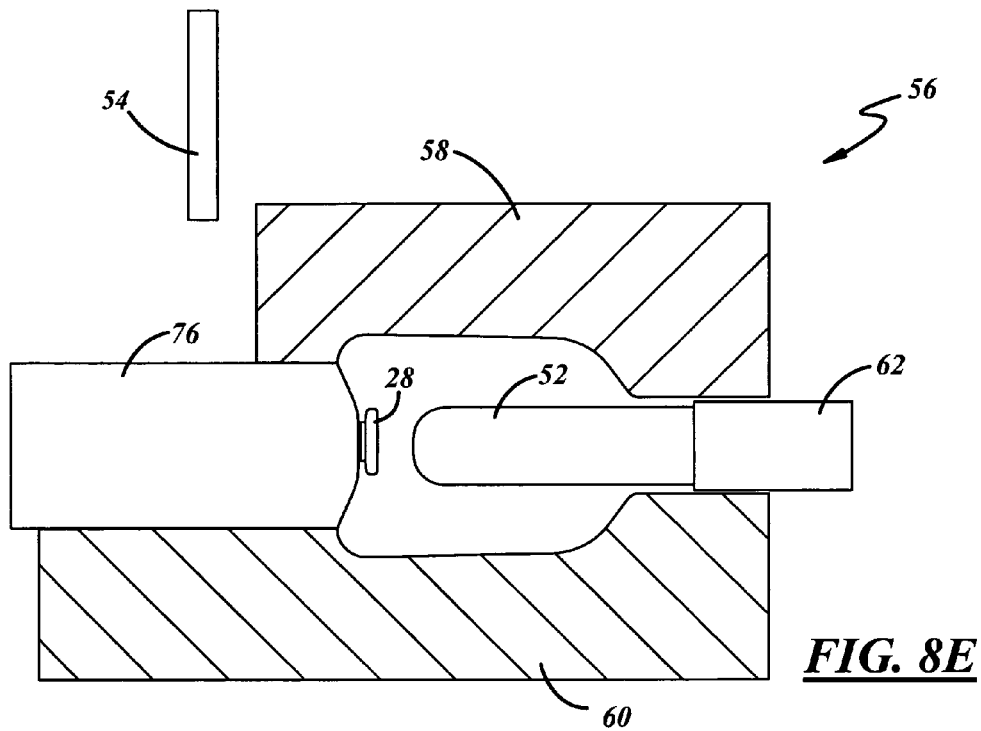
Figure 8F:
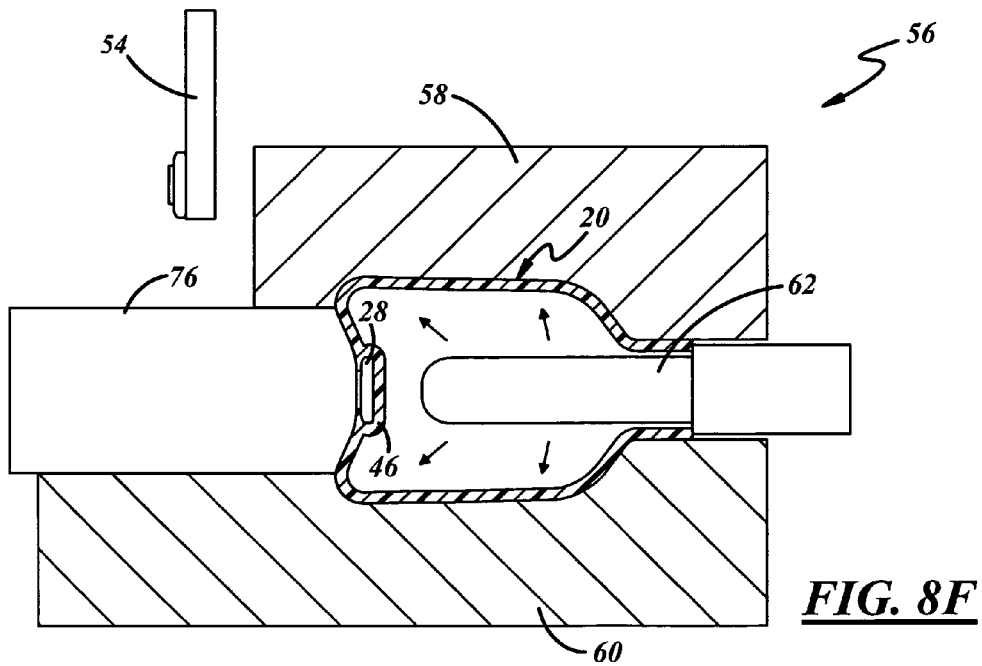

FIGS. 7A-7G illustrate another exemplary method of making container 20 (FIGS. 1-2). One of the blow mold sections 58,60, in this example mold section 58, includes a rotatable base 74 that forms the base of the blow mold cavity. Actuator 54 is extended (FIG. 7A to FIG. 7B) to fasten insert 28 onto an external surface of mold base 74. Actuator 54 then is retracted (FIG. 7C) and mold base 74 is moved (FIG. 7D) so that the external surface of base 74 to which insert 28 is attached becomes an internal mold surface (FIG. 7E). Mold sections 58,60 then are closed (FIG. 7F) to form the mold cavity with insert 28 disposed within the mold cavity. Preform 52 then is blown within the mold cavity (FIG. 7G) to form container 20 including pocket 46 in which insert 28 is captured. The mold sections then are opened and the container is moved to an ejection station.

FIGS. 8A-8F illustrate yet another exemplary method of making container 20 (FIGS. 1 and 2). In this embodiment, one of the mold sections, in this example mold section 60, includes a sliding base 76 that is slidable between an open position illustrated in FIGS. 8A-8C and a closed position illustrated in FIGS. 8D-8F. In the open position of FIGS. 8A-8C, insert 28 is carried by actuator 54 to a position overlying the surface of mold base 76 (FIG. 8B) and insert 28 is mounted on the surface of mold base 76. With actuator 54 retracted (FIG. 8C), mold base 76 is moved to the closed position (FIG. 8D) and mold section 58 also is moved to the closed position (FIG. 8E) to capture mold base 76 and form the blow mold cavity. Preform 52 then is blown (FIG. 8F) to form container 20, including pocket 46 in which insert 28 is captured. The mold sections are opened and the container is moved to an ejection station.

Although the method of manufacture has been described in conjunction with several examples of a multistation injection blow molding process, the principles of the disclosure are by no means limited to this particular type of process. For example, the injection blow molding process could include additional stations, such as between the injection station and the blow station, for adding layers to the preform and/or otherwise conditioning the preform prior to blow molding. Indeed, the principles of the present disclosure in their broadest aspects can readily be implemented in other types of preform and/or container manufacturing processes, such as a reheat blow molding process in which a container preform is injection or compression molded, held and then reheated or otherwise conditioned prior to blow molding. In a reheat blow molding (including reheat stretch blow molding) process of this type, the RFID insert could be secured to the container preform, preferably the closed end of the preform, after reheating or other conditioning of the preform, while the preform is at elevated temperature, prior to blow molding.

Preform 52 and blow molded container body 22 are illustrated in the drawings as being of monolayer construction. However, the preform and container could be of multilayer construction. For example, the preform could be formed by sequential or simultaneous injection molding of multiple plastic layers. The preform initially could be molded of monolayer construction with additional layers being applied prior to blow molding. Indeed, inasmuch as the RFID tag and insert preferably are attached to the preform, most preferably to the closed end of the preform, or are placed at the surface of the blow mold cavity, after the preform itself is fully formed, the RFID insert does not present any impediment to manufacture of the preform in any desired process, geometry or construction.

Insert 28 or 28*a* can be temporarily mounted on actuator 54 and/or blow mold segments 74,76 using any suitable technique. For example, the insert could be mounted to the actuator or mold segment using the techniques disclosed in above-noted U.S. application Ser. No. 11/348,622. As an alternative, the insert could be mounted on actuator 54 and/or mold segment 74 and/or mold segment 76 using snap fingers of the type disclosed in U.S. application.

There thus have been disclosed a method of making a plastic container, a method of making a plastic container preform, a plastic container, a plastic container preform and an RFID insert for a plastic container or preform. The disclosure has been presented in conjunction with exemplary embodiments, and additional modifications and variations have been discussed. Other modifications and variations readily will suggest themselves to persons of ordinary skill in the art in view of the foregoing description. For example, microtaggants, chemical tracers, fluorescent agents and/or other features, overt and/or covert, could be included in the insert housing and/or the container to provide additional layers of security. Insert 28 could include an RFID tag removal/disable feature, such as disclosed in U.S. application 11/595,372. The present disclosure is intended to embrace all such modifications and variations as fall within the spirit and broad scope of the appended claims.

The invention claimed is:

1. A method of making a plastic container, which includes the steps of:
   (a) providing a plastic container preform,
   (b) placing said plastic container preform in a blow mold,
   (c) blowing said plastic container preform within said blow mold to form a hollow plastic container,
   (d) placing an RFID tag disposed in a housing having a wall on an actuator external to said blow mold, and
   (e) prior to said step (c) actuating said actuator and mounting said RFID tag to an external surface of said preform so that said RFID tag is blow molded into an outwardly open pocket of said container during said step (c), when container material is blown against said housing wall which forms a dam against flow of container material around said housing and forms an opening into said pocket through which said housing is visible,
   wherein said step (e) includes mounting said RFID tag to a closed end of said preform such that said RFID tag is molded into a base of said container following said step (c), and
   wherein said housing has external features that are embedded into said end of said preform during said step (e).

2. The method set forth in claim 1 wherein said step (e) is carried out by extending said actuator into said mold following said step (b).

3. A method of making a container preform for blow molding into a plastic container, which includes the steps of:
   (a) molding a preform of plastic material at elevated temperature, and
   (b) securing an RFID tag onto said preform following said step (a) and while said preform is at elevated temperature,
   wherein said RFID tag is disposed within a plastic housing including a base with a peripheral wall, and a disk mounted within the peripheral wall to capture said RFID tag and having external features, and wherein said step (b) includes securing said plastic housing to an outside surface of said preform by embedding said external features in said outside surface of said preform wherein said external features do not extend to the interior of said preform.

4. The method set forth in claim 3 wherein said preform molded in said step (a) has a closed end, and wherein said step (b) includes securing said RFID tag to an outside surface of said closed end.

5. The method set forth in claim 4 including the step of: (c) blow molding said preform into a plastic container having said housing on a base of said container.

6. A method of making a plastic container, which includes the steps of:
   (a) providing a plastic container preform at elevated temperature,
   (b) placing said plastic container preform in a blow mold,
   (c) blowing said plastic container preform within said blow mold to form a hollow plastic container having a container base,
   (d) providing an RFID tag disposed in a housing having a wall, and
   (e) between said steps (a) and (c), securing said RFID tag to an external surface of said closed end such that said RFID tag is disposed on said container base following said step (c),
   wherein said RFID tag is blow molded into an outwardly open pocket of said container when container material is blown against said housing wall which forms a dam against flow of container material around said housing and forms an opening into said pocket through which said housing is visible, and
   wherein said step (d) includes providing said housing with at least one external feature, and said step (e) includes embedding said at least one external feature in said closed end of said preform wherein said at least one external feature does not extend to the interior of said plastic container preform.

7. The method set forth in claim 6 wherein said housing includes a base having a peripheral wall and a disk having a periphery internally engaged by said peripheral wall, said RFID tag being disposed on an inlay captured between said base and said disk within said peripheral wall, said at least one external feature being disposed on one of said base and said disk.

8. The method set forth in claim 7 wherein the other of said base and said disk includes an annular wall that cooperates with said blow mold during said step (e) to prevent container material from covering a center portion of said housing.

9. A method of making a plastic container, which includes the steps of:
   (a) providing a plastic container preform,
   (b) placing said plastic container preform in a blow mold,
   (c) blowing said plastic container preform within said blow mold to form a hollow plastic container, (d) placing an insert having a wall on an actuator external to said blow mold, and (e) prior to said step (c) actuating said actuator and mounting said insert to an external surface at a closed end of said preform so that said insert is blow molded into an outwardly open pocket of said container during said step (c) when container material is blown against said insert wall which forms a dam against flow of container material around said insert and forms an opening into said pocket through which said insert is visible, wherein said insert has external features that are embedded into said end of said preform during said step (e) and said external features do not extend to the interior of said preform.

10. The method set forth in claim 9 wherein said insert is a plastic insert.

* * * * *